United States Patent [19]
Obrecht et al.

[11] Patent Number: 6,127,488
[45] Date of Patent: Oct. 3, 2000

[54] RUBBER MIXTURES WHICH CONTAIN SBR RUBBER GELS

[75] Inventors: Werner Obrecht, Moers; Thomas Scholl, Bergisch Gladbach; Ulrich Eisele, Leverkusen; Winfried Jeske, Burscheid; Peter Wendling, Leverkusen; Adolf Schmidt, Köln, all of Germany

[73] Assignee: Bayer AG, Leverkusen, Germany

[21] Appl. No.: 09/005,966

[22] Filed: Jan. 12, 1998

[30] Foreign Application Priority Data

Jan. 17, 1997 [DE] Germany .......................... 197 01 488

[51] Int. Cl.[7] .......................... C08F 12/08; C08F 36/06; C08L 9/00; C08Y 3/40; B60C 11/00
[52] U.S. Cl. .................... 525/333.3; 525/332.2; 525/333.1; 525/99; 524/495; 152/209 RR
[58] Field of Search .............. 525/333.1, 333.2, 525/333.3, 99; 524/495; 152/209 RR

[56] References Cited

U.S. PATENT DOCUMENTS

| | | | |
|---|---|---|---|
| 4,042,647 | 8/1977 | Cornell | 525/234 |
| 4,104,210 | 8/1978 | Coran et al. | 525/232 |
| 4,157,361 | 6/1979 | Cornell | 525/87 |
| 4,482,678 | 11/1984 | Furukawa et al. | 525/236 |
| 4,611,030 | 9/1986 | Kan et al. | 525/99 |
| 4,732,927 | 3/1988 | Ida et al. | 524/495 |
| 4,914,147 | 4/1990 | Mouri et al. | 524/495 |
| 5,262,213 | 11/1993 | Rodgers et al. . | |
| 5,395,891 | 3/1995 | Obrecht et al. . | |
| 5,510,419 | 4/1996 | Burgoyne et al. . | |
| 5,686,530 | 11/1997 | Halasa et al. | 525/98 |

FOREIGN PATENT DOCUMENTS

| | | |
|---|---|---|
| 450 983 | 10/1991 | European Pat. Off. . |
| 42 20 563 | 1/1994 | Germany . |
| 1 078 400 | 8/1967 | United Kingdom . |
| 1087400 | 8/1967 | United Kingdom . |

OTHER PUBLICATIONS

Whelan et.al. Developments in Rubber Technology, Applied Sci Publishers, London, N–Ypp 21–57, Rubber Chemistry and Technology, American Chem. Society, V.53, #1, 1980, pp141–150.

*Primary Examiner*—David W. Wu
*Assistant Examiner*—Tanya Zalukaeva
*Attorney, Agent, or Firm*—Connolly Bove Lodge & Hutz LLP

[57] ABSTRACT

Rubber mixtures prepared from at least one styrene/butadiene rubber gel and at least one rubber which contains double bonds and optionally further fillers and rubber auxiliary substances are in particular suitable for the preparation of vulcanizates having unusually high damping at temperatures of from −20 to +20° C. as well as unusually low damping at temperatures of from 40 to 80° C. The rubber mixtures may therefore be used, for example, to manufacture vehicle tires which grip in the wet and have low rolling resistance.

9 Claims, No Drawings

RUBBER MIXTURES WHICH CONTAIN SBR RUBBER GELS

The invention relates to mixtures of rubbers which contain C=C double bonds and styrene/butadiene rubber gels (SBR gels) and to vulcanisates prepared therefrom. The vulcanisates demonstrate unusually high damping at temperatures of from −20 to +20° C. and unusually low damping at temperatures of from 40 to 80° C., and are therefore particularly suitable for manufacturing vehicle tire treads which give good grip in the wet and low rolling resistance.

The literature describes a large number of measures designed to reduce the rolling resistance of tires, including, inter alia, the use of polychloroprene gels (EP-A 405 216) and polybutadiene gels (DE-A 42 20 563) in tire treads manufactured from rubbers which contain C=C double bonds. Disadvantages of using polychloroprene gel arise from the high cost of the rubber, the high density of polychloroprene and the ecological disadvantages to which the chlorine-containing components can be expected to give rise in scrap tire recycling. While polybutadiene gels according to DE-A 42 20 563 do not have these disadvantages, the dynamic damping is in this case reduced at both low temperatures (−20 to +20° C.) and also at higher temperatures (40-80° C.), which in practice means that advantages in terms of rolling resistance are accompanied by disadvantages in terms of tire grip in the wet. Sulphur-cross-linked rubber gels according to GB-PS 1 078 400 have no reinforcing effect and are therefore unsuitable for the present application.

It has now surprisingly been found that rubber vulcanisates which contain C=C double bonds and are filled with special SBR gels have high dynamic damping at low temperatures and low dynamic damping at higher temperatures, such that advantages result in terms of both rolling resistance and grip in the wet. Particularly good properties result from using SBR gels in rubber mixtures which contain polybutadiene rubber.

The present invention therefore provides mixtures prepared from at least one styrene/butadiene rubber gel (A) and at least one rubber which contains double bonds (B), wherein the styrene/butadiene rubber gel content is from 1 to 100 parts by weight, preferably 5 to 75 parts by weight, related to 100 parts by weight of rubber which contains C=C double bonds, and optionally further fillers and rubber auxiliary substances.

Styrene/butadiene rubber gels (A) are understood to denote microgels which are prepared by cross-linking SBR—styrene/butadiene copolymers which contain from 1 to 80 wt. %, preferably 5 to 50 wt. %, of styrene, and/or XSBR—styrene/butadiene copolymers and graft polymers with further polar unsaturated monomers such as acrylic acid, methacrylic acid, acrylamide, methacrylamide, N-methoxymethyl methacrylic acid amide, N-acetoxymethyl methacrylic acid amide, acrylonitrile, dimethyl acrylamide, hydroxyethyl acrylate, hydroxyethyl methacrylate, which contain from 1 to 75 wt. % of styrene and from 1 to 20 wt. % of polar monomers incorporated by polymerisation.

The styrene/butadiene rubber gels have particle diameters of from 5 to 1000, preferably 20 to 400 nm (DVN value to DIN 53 206) and swelling indices ($Q_i$) in toluene of from 1 to 15, preferably 1 to 10. The swelling index is calculated from the weight of the gel when it contains solvent (following centrifuging at 20,000 rpm) and its weight when dry:

$Q_i$ wet weight of gel/dry weight of gel.

As an example of determining the swelling index, 250 mg of SBR gel is swelled in 25 ml toluene for 24 hours, with shaking. The gel is centrifuged off and weighed, and is then dried at 70° C. until the weight is constant, and is reweighed.

The styrene/butadiene rubber starting products are preferably prepared by emulsion polymerisation. In this connection see, for example, I. Franta, Elastomers and Rubber Compounding Materials, Elsevier, Amsterdam 1989, pp. 88 to 92.

The cross-linking of the rubber starting products to form styrene/butadiene rubber gels takes place in the latex state. This may be during polymerisation, as a result of continuing the polymerisation to high conversions or in the monomer feeding process as a result of polymerisation at high internal conversions or as a result of post-cross-linking after polymerisation, or both processes may be combined. The rubber starting products may also be prepared by polymerisation in the absence of regulators.

The styrene/butadiene rubber may also be cross-linked by copolymerisation with multifunctional compounds having a cross-linking action. Preferred multifunctional comonomers are compounds having at least two, preferably 2 to 4, copolymerisable C=C double bonds, such as diisopropenylbenzene, divinylbenzene, divinylether, divinylsulphone, diallyl phthalate, triallyl cyanurate, triallyl isocyanurate, 1,2-poly-butadiene, N,N'-m-phenylene maleic imide and/or triallyl trimellitate. The following are furthermore considered: acrylates and methacrylates of polyvalent, preferably divalent to tetravalent, $C_2$–$C_{10}$ alcohols, such as ethylene glycol, propanediol-1,2, butanediol, hexanediol, polyethylene glycol, having 2 to 20, preferably 2 to 8 oxyethylene units, neopentyl glycol, bisphenol A, glycerol, trimethylol propane, pentaerythritol, sorbitol and unsaturated polyesters prepared from aliphatic diols and polyols and maleic acid, fumaric acid and/or itaconic acid.

The styrene/butadiene rubbers may also be cross-linked in the latex form to form SBR rubber gels, as a result of post-cross-linking them with chemicals having a cross-linking action. Suitable chemicals having a cross-linking action are, for example, organic peroxides, for example, dicumyl peroxide, t-butylcumyl peroxide, bis-(t-butyl-peroxyisopropyl) benzene, di-t-butyl peroxide, dibenzoyl peroxide, bis-(2,4-dichlorobenzoyl) peroxide, t-butyl perbenzoate, and organic azo compounds such as azo-bis-isobutyronitrile and azo-bis-cyclohexanenitrile, and dimercapto and polymercapto compounds such as dimercaptoethane, 1,6-dimercaptohexane, 1,3,5-trimercaptotriazine, and mercapto-terminating polysulphide rubbers such as mercapto-terminating reaction products of bis-chloroethyl formal with sodium polysulphide. The optimal temperature for the post-cross-linking operation is naturally dependent on the reactivity of the cross-linking agent and may be from room temperature up to approx. 170° C., optionally at elevated pressure. See in this context Houben-Weyl, Methoden der organischen Chemie [Methods in Organic Chemistry], 4th edition, Vol. 14/2, p. 848. Peroxides are particularly preferred cross-linking agents.

It is also optionally possible to enlarge the particles by agglomeration before, during or after the post-cross-linking in latex form.

Styrene/butadiene rubbers which have been prepared in organic solvents may also serve as starting products for the preparation of the styrene/butadiene rubber gels. In this case it is advisable to emulsify the rubber solution in water, optionally with the aid of an emulsifying agent, and to follow this, either before or after removing the organic solvent, with cross-linking of the emulsion thus obtained using suitable cross-linking agents. The cross-linking agents previously named are suitable cross-linking agents.

Preferred rubbers (B) contain double bonds corresponding to iodine values of at least 2, preferably from 5 to 470. Iodine values are generally determined by addition of iodine chloride in ethanoic acid in accordance with Wijs, DIN 53 241, Part 1. The iodine value defines the number of grammes of iodine chemically bound in 100 g of a substance.

The rubbers (B) generally have Mooney viscosities ML 1+4/100° C. (DIN 53 523) of from 10 to 150, preferably 20 to 120.

In addition to natural rubber, synthetic rubbers are also preferred rubbers (B). Preferred synthetic rubbers are described in, for example, I. Franta, Elastomers and Rubber Compounding Materials, Elsevier, N.Y. 1989 or in Ullmanns' Encyclopedia of Industrial Chemistry, Vol. A23, VCH Verlagsgesellschaft, Weinheim 1993. They include, inter alia, the following:

BR—polybutadiene

ABR—butadiene/acrylic acid-$C_{1-4}$ alkylester copolymers

IR—polyisoprene

SBR—styrene/butadiene copolymers which contain from 1 to 60 wt. %, preferably 2 to 50 wt. %, of styrene XSBR—styrene/butadiene copolymers and graft polymers with acrylic acid, methacrylic acid, acrylonitrile, hydroxyethyl acrylate and/or hydroxyethyl methacrylate, which contain from 2 to 50 wt. % of styrene and from 1 to 30 wt. % of polar monomers incorporated by polymerisation IIR—isobutylene/isoprene copolymers NBR—butadiene/acrylonitrile copolymers which contain from 5 to 60 wt. %, preferably 10 to 50 wt. %, of acrylonitrile HNBR—partially hydrogenated NBR rubber in which up to 98.5% of the double bonds are hydrogenated EPDM—ethylene/propylene/diene copolymers and mixtures of the latter rubbers.

Natural rubber, emulsion SBR rubber and solution SBR rubber having a glass transition temperature above −50° C., optionally modified with silyl ethers or other functional groups, such as are described, for example, in EP-A 447 066, polybutadiene rubber having a high cis-1,4 content (>90%) prepared using catalysts based on nickel, cobalt, titanium, or neodymium, and polybutadiene rubber which contains 0 to 75% of vinyl, and mixtures thereof, are in particular of interest for the manufacture of, for example, vehicle tires.

The rubber mixtures according to the invention which are prepared from the styrene/butadiene rubber gel (A) and the rubbers which contain double bonds (B) may additionally contain further fillers.

The following are particularly suitable fillers for the preparation of the rubber mixtures and vulcanisates according to the invention:

carbon blacks. The carbon blacks to be used in this case are prepared by the lamp black, furnace black or channel black processes and have BET surface areas of from 20 to 200 $m^2/g$, such as, for example, SAF, ISAF, IISAF, HAF, FEF or GPF carbon blacks, highly dispersed silicas prepared, for example, by precipitating silicate solutions or by flame hydrolysis of silicon halides and having specific surface areas of from 5 to 1000, preferably 20 to 400 $m^2/g$ (BET surface area), and primary particle sizes of from 5 to 400 nm. The silicas may optionally also be present as mixed oxides with other metal oxides, such as aluminium, magnesium, calcium, barium and zinc oxides and titanium oxides.

synthetic silicates such as aluminium silicate, alkaline earth metal silicates such as magnesium or calcium silicate, having BET surface areas of from 20 to 400 $m^2/g$ and primary particle diameters of from 10 to 400 nm, natural silicates such as kaolin, and other naturally occurring silicas, metal oxides such as zinc, calcium, magnesium and aluminium oxide, metal carbonates such as magnesium, calcium and zinc carbonate, metal sulphates such as calcium and barium sulphate, metal hydroxides such as aluminium and magnesium hydroxide, glass fibres and glass fibre products (mats, extrudates) or glass microbeads rubber gels based on polychloroprene and/or polybutadiene having particle sizes of from 5 to 1000 nm.

The named fillers may be utilised either alone or in mixture. In a particularly preferred embodiment of the process, from 10 to 100 parts by weight of styrene/butadiene rubber gel (A), optionally together with from 0.1 to 100 parts by weight of carbon black and/or from 0.4 to 100 parts by weight of light-coloured fillers, in each case related to 100 parts by weight of rubber (B), are utilised to prepare the mixtures.

The rubber mixtures according to the invention may contain further rubber auxiliary substances such as cross-linking agents, reaction accelerators, antioxidants, heat stabilisers, light stabilisers, ozone stabilisers, processing auxiliary substances, plasticisers, tackifiers, blowing agents, dyes, pigments, waxes, extenders, organic acids, retardants, metal oxides and filler activators such as triethanolamine, polyethylene glycol, hexanetriol, bis(triethoxysilylpropyl) tetrasulphide, etc., which are known in the rubber industry.

The rubber auxiliary substances are utilised in conventional quantities as dictated, inter alia, by the purpose for which they are intended. Conventional quantities are, for example, quantities of from 0.1 to 50 wt. %, related to rubber (B).

Sulphur, sulphur donors or peroxides may be utilised as conventional cross-linking agents. The rubber mixtures according to the invention may furthermore contain vulcanisation accelerators. Examples of suitable vulcanisation accelerators are mercaptobenzothiazoles, mercaptobenzothiazole sulphene amides, guanidines, thiurams, dithiocarbamates, thioureas and thiocarbonates. The vulcanisation accelerators and sulphur or peroxides are utilised in quantities of from 0.1 to 10 wt. %, preferably 0.1 to 5 wt. %, related to rubber (B).

The rubber mixtures according to the invention may be vulcanised at temperatures of from 100 to 200° C., preferably 130 to 180° C., optionally under 10 to 200 bar pressure.

The rubber mixtures according to the invention which have been prepared from styrene/butadiene rubber gel (A) and the rubbers which contain C=C double bonds (B) may be prepared by more than one method: one possibility is naturally to mix the individual solid components. Rolls, internal mixers and compounding extruders are examples of units suitable for this purpose. It is, however, also possible to mix them by combining the latices of the styrene/butadiene rubber gels with the latices of the uncrosslinked rubbers. The mixtures according to the invention thus prepared may be isolated as normal by evaporation, precipitation or freeze coagulation (cf U.S. Pat. No. 2,187,146). The mixtures according to the invention may be obtained in direct manner as rubber/filler formulations as a result of mixing fillers into the latex mixtures, followed by working up.

The rubber mixtures prepared from the styrene/butadiene rubber gel (A) and the rubbers which contain double bonds (B) may be further mixed with additional fillers and optionally rubber auxiliary substances in conventional mixing units such as rolls, internal mixers and compounding extruders. Preferred mixing temperatures are around 50 to 180° C.

The rubber vulcanisates according to the invention are suitable for making mouldings, for example for the manufacture of cable sheaths, hoses, transmission belts, conveyor belts, roll coverings, tires, in particular tire treads, shoe soles, sealing rings and damping elements.

EXAMPLES

Example 1

(a) Cross-linking the SBR Rubber in Latex Form 26,976 g of a SBR latex (Baystal BL 1357 from Bayer France, Port Jerome) containing 24 wt. % of styrene incorporated by polymerisation and having a particle size of 60 nm (DVN) and a solids content of 37.1 wt. % were diluted with 6,708 g water. 150 g dicumyl peroxide were added in an autoclave at 60° C. The mixture was then stirred under a nitrogen atmosphere at 60° C. for 2 hours, after which it was heated to 150° C. and stirred at that temperature for 45 minutes. After cooling, it was filtered through a monodur cloth (pore size 0.2 mm). The solids content of the rubber latex was 30 wt. %, the swelling index of the gel particles was 5, and the particle diameter 60 nm.

(b) Mixing the cross-linked SBR Rubber with Uncrosslinked Natural Rubber 5 kg of the rubber latex thus treated were then stirred into a mixture prepared from 5 kg natural rubber latex having a 30 wt. % solids content, 300 g of a 5% aqueous rosin soap solution (Dresinate 731, manufactured by Hercules) and 150 g of a 10% aqueous dispersion of Vulkanox 4020 antioxidant (manufactured by Bayer AG).

The latex mixture obtained contained cross-linked rubber and natural rubber in a 1:1 weight ratio.

(c) Coagulating the Rubber Mixture

To precipitate 3 kg of rubber mixture, 10.45 kg of the latex mixture obtained in process step (b) were stirred at 65° C. into a solution of 225 g NaCl, 40.8 g $Al_2(SO_4)_3 \times 18H_2O$ and 4.5 g gelatine in 30 l water, with the pH maintained at 4 by the addition of 10% $H_2SO_4$. The product was washed thoroughly with water and dried under vaccum at 70° C. for 2 days.

A master batch consisting of 50 wt. % cross-linked SBR rubber particles and 50 wt. % natural rubber was obtained.

Example 2

14,721 g of a SBR latex (SHQ 6254) containing 40 wt. % of styrene incorporated by polymerisation and having a particle size of 115 nm (DVN) and a 40.8 wt. % solids content were diluted with 5,370 g water. 39 g dicumyl peroxide were added in an autoclave at 60° C. The autoclave was sealed, blanketed with nitrogen at 5 bar pressure, and the pressure relieved. The procedure was repeated 3 times. The mixture was then stirred at 60° C. for 2 hours, after which it was heated to 150° C. and stirred at that temperature for 45 minutes. After cooling, it was filtered through a monodur cloth (pore size 0.2 mm). The solids content of the cross-linked rubber latex was 30 wt. %, the swelling index was 7 and the particle diameter 115 nm (DVN).

5 kg of the rubber latex thus cross-linked was then mixed with 5 kg natural rubber latex (30 wt % solids content) and coagulated, in accordance with the process of Example 1 b/c. A master batch consisting of 50 wt. % cross-linked SBR rubber particles and 50 wt. % natural rubber was obtained.

Example 3

14,721 g of a SBR latex (SHQ 6254) containing 40 wt. % of styrene incorporated by polymerisation and having a particle size of 115 nm (DVN) and a 40.8 wt. % solids content were diluted with 5,409 g water. 60 g dicumyl peroxide were added in an autoclave at 60° C. The autoclave was sealed, blanketed with nitrogen at 5 bar pressure, and the pressure relieved. The procedure was repeated 3 times. The mixture was then stirred at 60° C. for 2 hours, after which it was heated to 150° C. and stirred at that temperature for 45 minutes. After cooling, it was filtered through a monodur cloth (pore size 0.2 mm). The solids content of the cross-linked rubber latex was 30 wt. %, the swelling index was 5 and the particle diameter 115 nm (DVN).

5 kg of the rubber latex thus cross-linked was then mixed with 5 kg natural rubber latex (30 wt. % solids content) and coagulated, in accordance with the process of Example 1 b/c. A master batch consisting of 50 wt. % cross-linked SBR rubber particles and 50 wt. % natural rubber was obtained.

Example 4

14,721 g of a SBR latex (SHQ 6254) containing 40 wt. % of styrene incorporated by polymerisation and having a particle size of 115 nm (DVN) and a 40.8 wt. % solids content were diluted with 5,479 g water. 90 g dicumyl peroxide were added in an autoclave at 60° C. The autoclave was sealed, blanketed with nitrogen at 5 bar pressure, and the pressure relieved. The procedure was repeated 3 times. The mixture was then stirred at 60° C. for 2 hours, after which it was heated to 150° C. and stirred at that temperature for 45 minutes. After cooling, it was filtered through a monodur cloth (pore size 0.2 mm). The solids content of the cross-linked rubber latex was 30 wt. %, the swelling index was 4 and the particle diameter 115 nm (DVN).

5 kg of the rubber latex thus cross-linked was then mixed with 5 kg natural rubber latex (30 wt. % solids content) and coagulated, in accordance with the process of Example 1 b/c. A master batch consisting of 50 wt. % cross-linked SBR rubber particles and 50 wt. % natural rubber was obtained.

Comparative Example 1

12,368 g of a BR latex (SHQ 6022) having a particle size of 140 nm (DVN) and a 42.5 wt. % solids content were diluted with 5,315 g water. 78.75 g dicumyl peroxide were added in an autoclave at 60° C. The autoclave was sealed, blanketed with nitrogen at 5 bar pressure, and the pressure relieved. The procedure was repeated 3 times. The mixture was then stirred at 60° C. for 2 hours, after which it was heated to 150° C. and stirred at that temperature for 45 minutes. After cooling, it was filtered through a monodur cloth (pore size 0.2 mm). The solids content of the cross-linked rubber latex was 45 wt. %, the swelling index was 3 and the particle diameter 150 nm (DVN).

(b) Mixing the Cross-linked BR Rubber with Uncross-linked Natural Rubber

1:1 weight ratio, prepared by the process of Example 1 of GB-PS 1 078 400.

Example 5

|  | Comp. Ex. 1 | Comp. Ex. 2 | Comp. Ex. 3 | Comp. Ex. 4 | Ex. A | Ex. B | Ex. C | Ex. D | Ex. E | Ex. F | Ex. G |
|---|---|---|---|---|---|---|---|---|---|---|---|
| Natural rubber TSR 5 | 25 | 0 | 0 | 25 | 25 | 0 | 0 | 25 | 25 | 25 | 25 |
| Buna CB 24 (Bayer AG) | 25 | 50 | 25 | 0 | 25 | 50 | 25 | 25 | 25 | 25 | 0 |
| L-SBR Buna VSL 2525–0 (Bayer AG) | 0 | 0 | 25 | 0 | 0 | 0 | 25 | 0 | 0 | 0 | 0 |
| Rubber mixture acc. to Comp. Ex. 1 | 100 | 100 | 100 | 0 | 0 | 0 | 0 | 0 | 0 | 0 | 0 |
| Rubber mixture acc. to Comp. Ex. 2 | 0 | 0 | 0 | 150 | 0 | 0 | 0 | 0 | 0 | 0 | 0 |
| Rubber mixture (SBR gel) acc. to Preparation Example 1 | 0 | 0 | 0 | 0 | 100 | 100 | 100 | 0 | 0 | 0 | 0 |
| Rubber mixture (SBR gel) acc. to Preparation Example 3 | 0 | 0 | 0 | 0 | 0 | 0 | 0 | 0 | 100 | 0 | 0 |
| Rubber mixture (SBR gel) acc. to Preparation Example 4 | 0 | 0 | 0 | 0 | 0 | 0 | 0 | 0 | 0 | 100 | 100 |
| Corax N 121 (Degussa) | 30 | 30 | 0 | 0 | 30 | 30 | 0 | 30 | 30 | 30 | 0 |
| Vulkasil S (Bayer AG) | 0 | 0 | 30 | 0 | 0 | 0 | 30 | 0 | 0 | 0 | 0 |
| Silan Si 69 (Degussa) | 0 | 0 | 2.3 | 0 | 0 | 0 | 2.3 | 0 | 0 | 0 | 0 |
| Renopal 450 plasticiser | 3 | | | | | | | | | | |
| Anti L wax | 1.5 | | | | | | | | | | |
| Vulkanox 4010 NA antioxidant (Bayer AG) | 1 | | | | | | | | | | |
| Vulkanox HS antioxidant (Bayer AG) | 1 | | | | | | | | | | |
| Sulphur | 1.6 | | | | | | | | | | |
| t-butylmercaptobenzothiazole sulphene amide | | | | | | | | | | | |
| Vulkacit NZ (Bayer AG) | 1 | 1 | 1.3 | 1 | 1 | 1 | 1.3 | 1 | 1 | 1 | 1 |
| Diphenylguanidine Vulkacit D (Bayer AG) | 0 | 0 | 0.8 | 0 | 0 | 0 | 0.8 | 0 | 0 | 0 | 0 |
| Kinetics of vulcanisation (MDR 2000, 160° C.) | | | | | | | | | | | |
| t-90 (minutes' vulcanisation at 160° C. (t 95 + 5 minutes) | 7.7 | 9 | 9.8 | 14.1 | 7.7 | 8.7 | 9.5 | 9.5 | 9.6 | 9.3 | 9.7 |
| Tensile strength (Mpa) | 21.3 | 19.3 | 18.5 | 8.4 | 24.5 | 20.8 | 20 | 19.2 | 21.6 | 21.4 | 22.4 |
| Elongation at break (%) | 452 | 407 | 411 | 667 | 491 | 456 | 429 | 450 | 466 | 471 | 659 |
| Modulus at 300% elongation (Mpa) | 14 | 13.1 | 12.8 | 1.5 | 12 | 10.8 | 11.3 | 10 | 12.2 | 12.3 | 7.5 |
| Hardness (Shore A) | 67 | 67 | 66 | 37 | 65 | 66 | 61 | 58 | 64 | 67 | 59 |
| Elasticity (%) at 23° C. | 47 | 47 | 45 | 66 | 37 | 39 | 40 | 35 | 32 | 33 | 29 |
| Elasticity (%) at 70° C. | 56 | 57 | 55 | 70 | 54 | 55 | 61 | 64 | 57 | 53 | 57 |
| Abrasion (cm$^3$) DIN 53 516 | 116 | 81 | 123 | 253 | 79 | 52 | 90 | 84 | 93 | 93 | 166 |

3,333 kg of the rubber latex thus treated were then stirred into a mixture prepared from 5 kg natural rubber having a solids content of 30 wt. %, 300 g of a 5% aqueous rosin soap solution (Dresinate 731 manufactured by Hercules) and 150 g of a 10% aqueous dispersion of Vulkanox 4020 antioxidant (manufactured by Bayer AG).

The latex mixture obtained contained cross-linked rubber and natural rubber in a 1:1 weight ratio.

(c) Coagulating the Latex

To precipitate 3 kg of rubber mixture, 8.78 kg of the latex mixture obtained in process step (b) were stirred at 65° C. into a solution of 225 g NaCl, 40.8 g Al$_2$(SO$_4$)$_3$×18 H$_2$O and 4.5 g gelatine in 30 l water, with the pH maintained at 4 by the addition of 10% H$_2$SO$_4$. The product was washed thoroughly with water and dried under vaccum at 70° C. for 2 days.

A master batch consisting of 50 wt. % cross-linked SBR rubber particles and 50 wt. % natural rubber was obtained.

Comparative Example 2

Mixture of a sulphur-cross-linked SBR rubber gel (22 wt. % styrene content, swelling index 33) in natural rubber in a The investigations show clearly that the styrene/butadiene rubber gels according to the invention afford markedly lower impact resilience values at 23° which, experience shows, correlate with greater grip of the tires in the wet, while impact resilience at 70° C. is at the same level as that of the comparative mixture, giving a rolling resistance of the same order of size. Surprisingly, the use of polybutadiene rubber in the rubber mixture results in a marked improvement in abrasion behaviour without substantially influencing grip in the wet (derived from impact resilience at 23° C.). A sulphur-cross-linked rubber gel according to GB-PS 1 078 400 demonstrates no reinforcing properties and is therefore unsuitable for the application.

What is claimed is:

1. Rubber mixtures prepared from at least one styrene/butadiene rubber gel (A) having a swelling index in toluene of from 1 to 15 and a particle size of from 5 to 1000 nm, and at least one rubber which contains double bonds (B), wherein the content of rubber gel (A) is from 1 to 100 parts by weight, related to 100 parts of rubber (B), and optionally fillers and rubber auxiliary substances.

2. Rubber mixtures as claimed in claim 1, containing 5 to 75 parts of (A) per 100 parts of (B).

3. Rubber mixtures as claimed in claim 1, containing substantially equal proportions of rubber gel (A) and rubber (B).

4. A vulcanizate prepared from the rubber mixture of claim 1.

5. A tire tread prepared from the rubber mixture of claim 1.

6. A tire tread having improved wet rolling grip, prepared from a rubber mixture comprising at least one styrene/butadiene rubber gel (A) having a swelling index in toluene of from 1 to 15 and a particle size of from 5 to 1000 nm, and at least one rubber which contains double bonds (B), wherein the content of rubber gel (A) is from 1 to 100 parts by weight, related to 100 parts of rubber (B), and optionally fillers and rubber auxiliary substances.

7. A process for the preparation of the rubber mixtures of claim 1 comprising mixing the styrene/butadiene rubber gel with the rubber.

8. The process of claim 7, wherein the mixing is performed in a mixing unit selected from the group consisting of rolls, internal mixers and compounding extruders at a temperature of 50° to 180° C.

9. A process for making tire treads comprising vulcanizing the rubber mixtures of claim 1.

* * * * *